Oct. 13, 1925.                                                    1,557,468
                        A. MONTIGNY
              PHOTOGRAPHIC PRINTING FRAME EASEL
                      Filed May 3, 1924            3 Sheets-Sheet 1
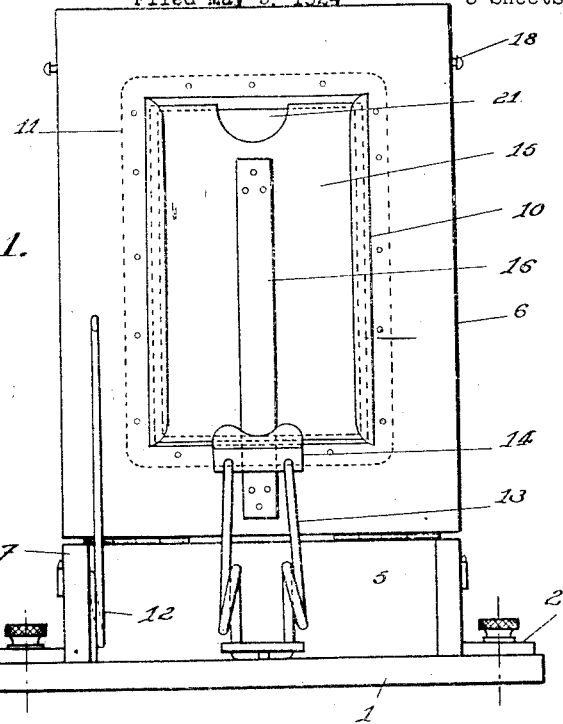
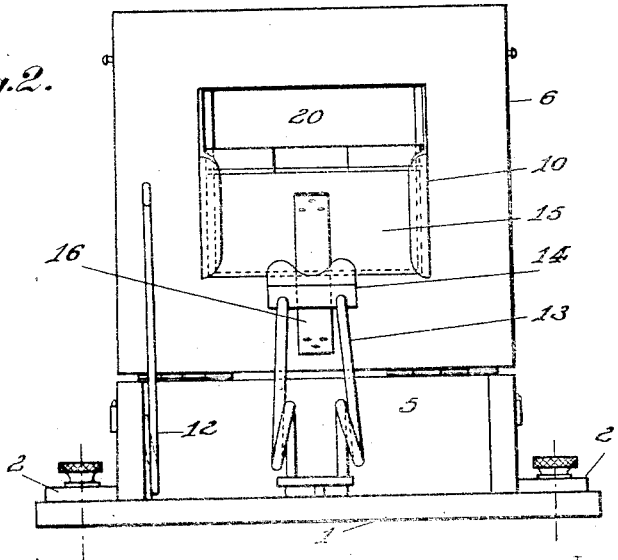
INVENTOR
ALBERT MONTIGNY
ATTORNEY Oct. 13, 1925.
A. MONTIGNY
1,557,468
PHOTOGRAPHIC PRINTING FRAME EASEL
Filed May 3, 1924    3 Sheets-Sheet 2
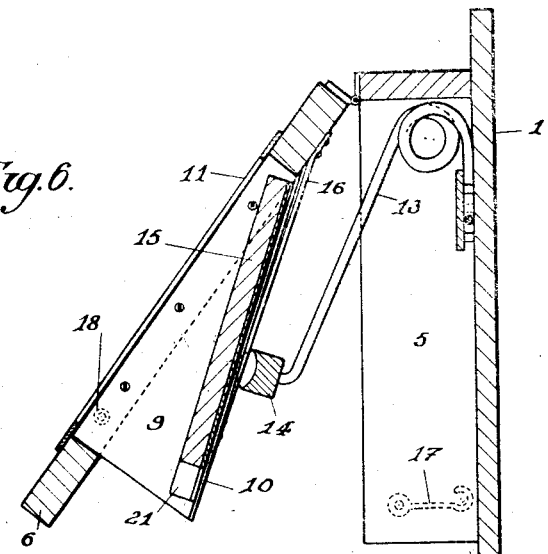
Fig. 6.
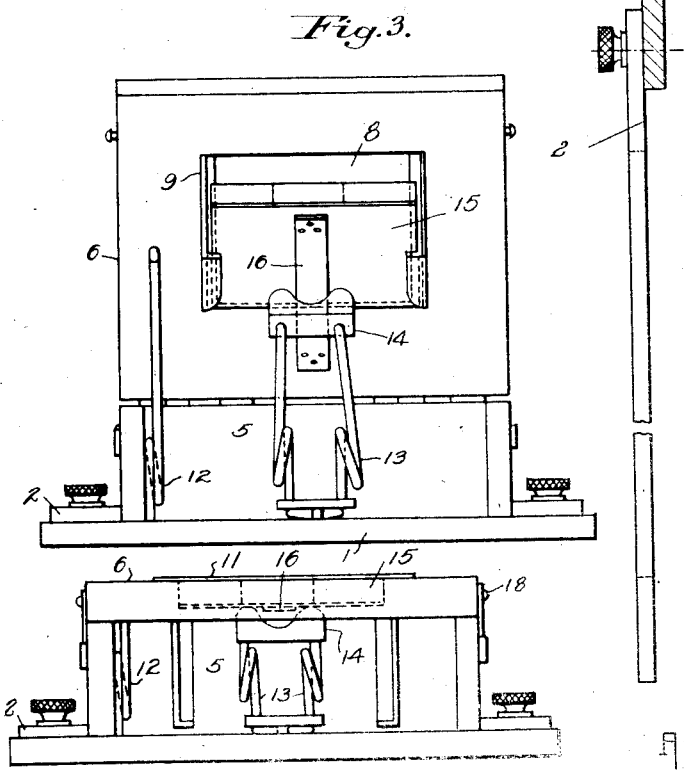
Fig. 3.
Fig. 4.
INVENTOR
ALBERT MONTIGNY
ATTORNEY

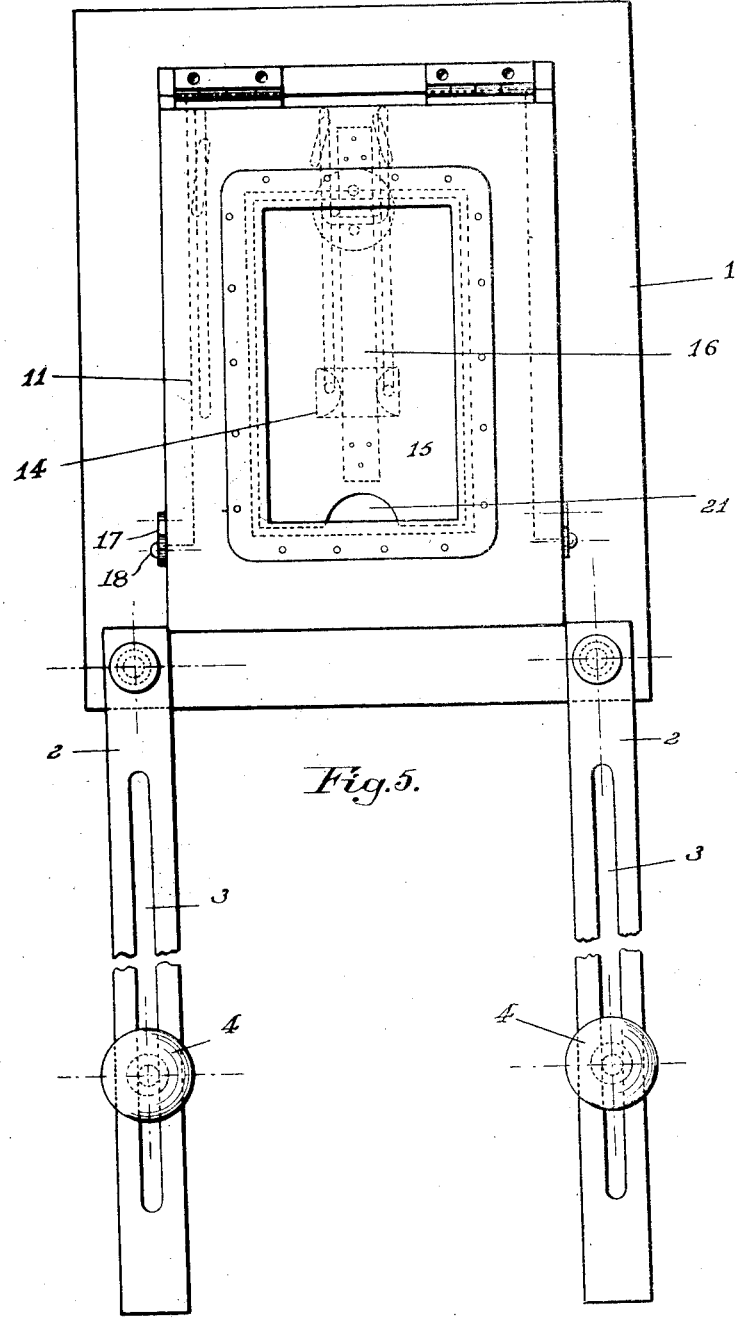

Patented Oct. 13, 1925.

1,557,468

UNITED STATES PATENT OFFICE.

ALBERT MONTIGNY, OF BRUSSELS, BELGIUM.

PHOTOGRAPHIC-PRINTING-FRAME EASEL.

Application filed May 3, 1924. Serial No. 710,873.

*To all whom it may concern:*

Be it known that I, ALBERT MONTIGNY, a subject of the King of the Belgians, and resident of Brussels, Belgium, have invented certain new and useful Improvements in Photographic-Printing-Frame Easels, of which the following is a specification.

My present invention has for its object to provide an improved apparatus for the rapid and continuous reproduction of photographs, wherein the adjustment of the parts being once effected, the sensitive paper will always be brought automatically to the correct and desired position, the sheet of paper being at the same time perfectly and uniformly held along its entire periphery, whereby I may obtain either a correct framing or a tracing or/and any inscription or formula formed by an opaque body, said framing or tracing being always reproduced at the same place on all successive photographs or prints reproduced from the same plate.

In the accompanying drawings I have illustrated by way of example one preferred embodiment of my invention, and Fig. 1 is a front view of my device with the cover completely raised.

Fig. 2 is a front view of the device in position for the insertion of the sensitive sheet of paper.

Fig. 3 is a front view of the device during the lowering of the cover.

Fig. 4 is a view similar to Fig. 3 at another stage of the lowering of the cover.

Fig. 5 is a plan view of the apparatus closed.

Fig. 6 is a vertical longitudinal section on line VI—VI in Fig. 2.

The apparatus comprises a base plate 1, on which are pivotally mounted two arms 2 (Fig. 5) provided on the greatest portion of their length with a slot 3 and serving to adjust the exact position of the apparatus with relation to the reproducing source of light. The plate 1 being placed upon a working table, will be brought to the focus and locked in place by means of bolts 4 extending through the slots 3 and the heads of which bear upon the arms 2, said bolts of course being adapted to be secured to any desired fixture.

The plate 1 constitutes the projecting bottom of a casing 5 comprising three sides and a cover 6 hinged to the side 7. Said cover is provided with a window 8, the opposite longitudinal sides of which are extended downwardly by means of metal or like strips 9, the lower rim portions 10 of which are bent horizontally. Secured on the cover is a narrow frame 11 projecting by a few millimeters beyond the periphery of the window.

Bearing upon the bottom plate 1 of the casing is a spring 12 the free end of which bears against the inner side of the cover and tends to open the same. Another double armed spring 13 also attached to the bottom plate 1 carries a block 14 at its two free ends, said block 14 acting against a plate 15 of the same size as the window 8 into which it fits. Said plate 15 is carried by a spring blade 16 attached to the lower face thereof and the end of the cover.

The sides of the casing are provided with outer hooks 17 adapted to engage knobs 18 secured to the sides of the cover.

If it is desired to adjust the device at the focus, the cover will be turned downwardly and locked in its closed position by the hooks 17, so that the operator will have his hands quite free for the locking of the device in the exact position, whereupon the bolts 4 will be tightened and the hooks 17 disengaged so as to enable the cover 6 to be moved by the springs 12 into the position shown in Fig. 2. In this position it will be seen that the cover will be supported by the spring 12, whilst the plate 15 owing to the less spring movement of the springs 13 is positioned inwardly of the cover and substantially in contact with the rims 10. In this way I obtain a free space 20 for the insertion of a sheet of sensitive paper upon the plate 15. As said plate has no pivotal connection and is entirely free it will permit the sheet of paper to move to the end wall of the window 8. The sheet of paper being inserted (and guided by the strips 9), the cover will be turned downwardly, whereby the same will first compress the spring 12 (Fig. 3), and the lowering being continued the plate 15 held stationary till now, will be moved away by the frame 11 engaging the upper rim thereof, whereby the spring 13 will also be compressed. At the end of the movement of the cover said spring 13 will press the plate 15 strongly and uniformly against the projecting portion of the frame 11, thereby holding and uniformly tightening the sheet of paper in place. The apparatus being once adjusted to the focus and the sheet of paper being each time automatically brought to the correct position, all that is necessary to do is to keep the cover lowered for the time required to obtain a perfect reproduction, which will be perfectly centered on the sheet of paper and in the example shown has a perfectly symmetric white framing (which obviously corresponds to the projecting portion of the frame 11), of course said frame 11 may be changed so as to obtain different framings, plain or apertured, symmetric or not, with or without inscriptions or ornaments, all in one operation and at a heretofore unknown velocity.

The photographs having been exposed sufficiently, the cover will be disengaged, the sheet of paper withdrawn (which is facilitated by the notch 21) and a fresh sheet of paper inserted.

It may be observed that the chief feature of my apparatus consists in that the paper holding plate 15 has its edges free and not provided with hinges or like pivotal connections, so that the sheet of paper will always be inserted completely and caused to exactly cover the plate 15.

Having now fully described my said invention, what I claim and desire to secure by Letters Patent, is:

1. In a photographic printing frame easel of the class described, a box-like base open at one side, a cover pivotally mounted on the base, means urging said cover towards its open position, a window or opening in said cover of the size of the sensitive sheet of paper, and a flat frame carried by said cover so as to project beyond the inner periphery thereof, of a plate suitably attached to the underside of said cover and adapted to press the sensitive sheet of paper against the projecting rims of said frame, means for yieldingly pressing said plate against said frame, means for locking the plate in its operative position, and means for adjusting the easel on the working table, substantially as set forth.

2. In a photographic printing frame easel of the class described, the combination with a box like base, a cover hinged to said base, a window in said cover of the size of the sensitive sheet of paper, a flat frame carried by the outer face of said cover so as to project beyond the inner periphery thereof, of a paper holding plate, a yielding connection between said plate and the pivotally mounted cover, said plate being adapted to press the sensitive sheet of paper against the projecting rims of said frame, means for yieldingly pressing said plate against frame upon the depression of the cover, means for locking the cover in its depressed position, and means for adjusting the easel on the working table, substantially as set forth.

3. In a photographic printing frame easel of the class described, the combination with a box-like base, a cover pivotally mounted on said base, a window in said cover of the size of the sensitive sheet of paper, a flat frame carried by the outer face of said cover so as to project beyond the inner periphery thereof, and means for adjusting said base on the working table, of a paper holding plate, free all along its periphery, a spring blade connecting said plate to the hinged side of the cover and urging the same towards its open position away from said cover, a suitable spring attached to the base and engaging the underside of said plate to hold the same firmly pressed against the projecting frame when the cover is depressed, and means for locking the cover in its depressed position, substantially as set forth.

4. In a photographic printing frame easel of the class described, the combination with a box-like base, two horizontal arms pivotally mounted on said base and the working table to enable the base to be adjusted as desired, of a cover pivotally mounted or hinged to said base, a window in said cover of the size of the sensitive sheet of paper, a flat frame carried by the outer face of the cover so as to project beyond the inner periphery thereof, of a paper holding plate, free all along its periphery, a spring blade connecting said plate to the hinged side of the cover and urging the same towards its open position away from said cover, means for yieldingly pressing said plate against the flat frame upon the depressions of the cover, and means for locking the cover in its depressed position, substantially as set forth.

In testimony whereof I have hereunto set my hand.

ALBERT MONTIGNY.